(Model.)
J. C. F. HAMMER.
CULTIVATOR.
No. 248,170.    Patented Oct. 11, 1881.
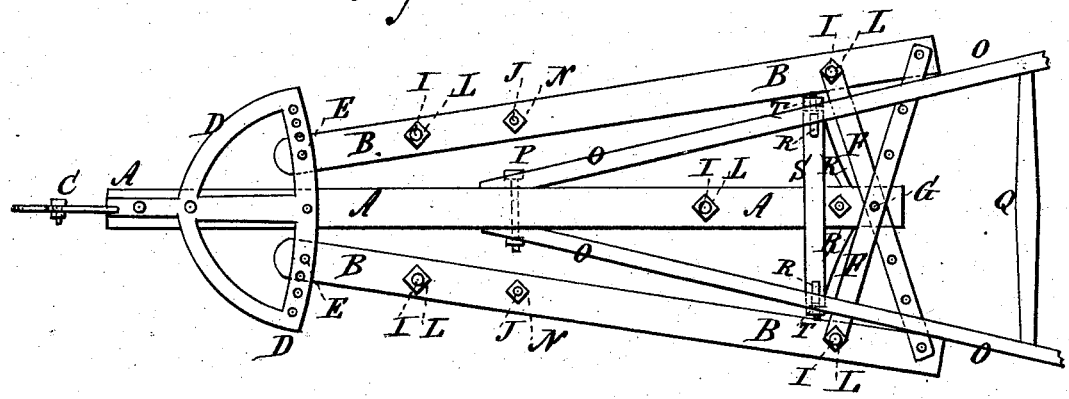
Fig: 1.
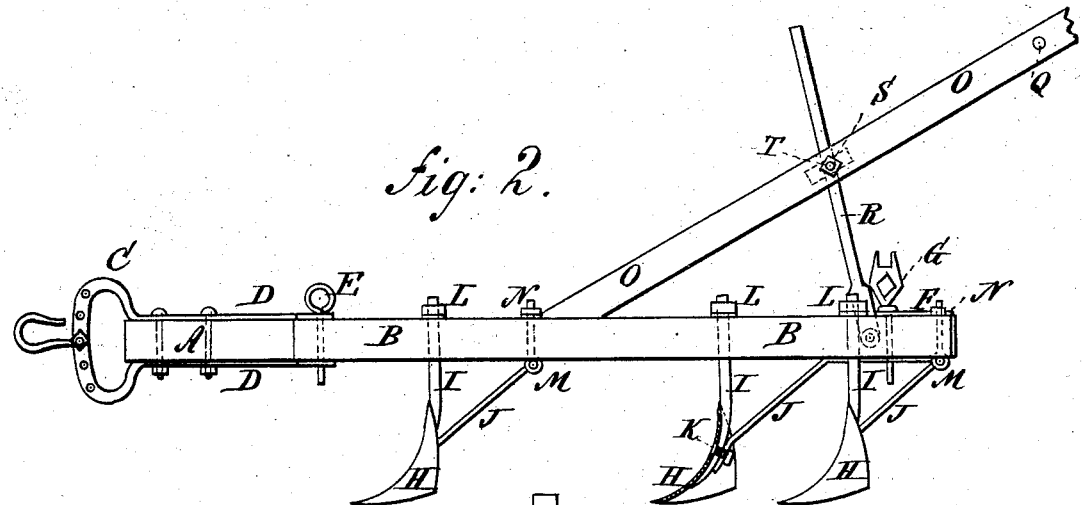
Fig: 2.
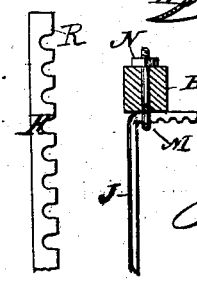
Fig: 3.
WITNESSES:
A. Schehl.
C. Sedgwick
INVENTOR:
J. C. F. Hammer
BY
ATTORNEYS.

UNITED STATES PATENT OFFICE.

JOHANN C. F. HAMMER, OF CULLMAN, ALABAMA.

CULTIVATOR.

SPECIFICATION forming part of Letters Patent No. 248,170, dated October 11, 1881.

Application filed October 28, 1880. (Model.)

*To all whom it may concern:*

Be it known that I, JOHANN C. F. HAMMER, of Cullman, in the county of Cullman and State of Alabama, have invented a new and useful Improvement in Cultivators, of which the following is a specification.

Figure 1 is a plan view of the improvement. Fig. 2 is a side elevation, and Fig. 3 detail views.

Similar letters of reference indicate corresponding parts.

The object of this invention is to furnish cultivators so constructed that the plows can be adjusted to keep them parallel with the line of draft, as hereinafter described.

A is the center beam, and B B are the side beams, of the cultivator.

The forward end of the center beam, A, projects beyond the forward ends of the side beams, B, and has a clevis, C, attached to it to receive the draft.

To the upper and lower sides of the forward part of the center beam, A, are attached two parallel semicircular or triangular plates or frames, D. In the rear bars of the frames D, upon the opposite sides of the center beam, A, are formed holes to receive the pins or bolts E, which also pass through holes in the forward ends of the side beams, B. Several holes are formed in the rear bars of the frames D to receive the bolts E, so that the forward ends of the side beams, B, can be adjusted at a greater or less distance from the center beam, A, as may be required.

To the side beams, B, at a little distance from their rear ends, are pivoted the ends of two bars, F, which cross or overlap each other above the rear end of the center beam, A, and are secured to each other and to the said center beam by a pin, G. Upon the upper end of the pin G is formed a wrench to turn the nuts of all the bolts of the cultivator. Several holes are formed in the bars F to receive the wrench-pin G, so that the rear ends of the side beams, B, can be adjusted at a greater or less distance from the central beam, A, as may be desired. With this construction both ends of the side beams, B, can be adjusted at the same time, or either end can be adjusted independent of the other end, as may be desired.

H are the plows, which are so formed as to break up the soil raised by them, so that no guards will be required to protect the plants.

The plows H are secured to the lower ends of the standards I and braces J by a bolt, K. The standards I pass up through the beams B and have screw-threads formed upon their upper ends to receive the nuts L. The upper ends of the braces J are bent to one side and notched, as seen in Fig. 3, and are passed through the eyes of eyebolts M, which pass up through the side beams, B, and have nuts N screwed upon their upper ends. With this construction, by loosening the nuts L N, the plows H can be adjusted parallel with the line of draft, whatever be the inclination of the side beams, B, so that the said plows H will always work squarely in the ground. The brace J of the standard I, attached to the center beam, A, need not have the eyebolt M, as it does not require to be adjusted.

O are the handles, the forward ends of which are pivoted to the opposite sides of the middle part of the center beam, A, by a bolt, P. The rear parts of the handles O are connected and held in proper relative position by a round, Q. To the opposite sides of the rear part of the center beam, A, are bolted the lower ends of two bars, R, which incline from each other and pass through slots in the end parts of the cross-bar S. The cross-bar S passes through holes in the handles O, and has screw-threads cut upon its ends to receive the nuts T. With this construction, by tightening the nuts T, the bars R will be clamped against the inner sides of the handles O, so that the height of the handles O can be regulated by loosening the nuts T. The bars R have notches or transverse grooves formed in their inner sides to receive the edge of the bar S at the inner ends of its slots, and prevent the bars R from slipping up and down after the nuts T have been tightened.

Having thus described my invention, I claim as new and desire to secure by Letters Patent—

The combination, with the plows H and standard I, journaled at the upper end to turn in beams B, and held by a clamp-nut at the top, of the brace J, bent to one side at the upper end and there notched, the eyebolts M passing up through beams B and the clamp-nuts N, as and for the purpose specified.

JOHANN CARL FRIEDRICH HAMMER.

Witnesses:
CHRISTIAN WENGEL,
GEORGE MERLET.